Jan. 12, 1926.  
H. P. MACDONALD  
FLEXIBLE JOINT  
Filed June 26, 1920  
1,569,839  
2 Sheets-Sheet 1

WITNESS.  
Gustav Genzlinger.

INVENTOR.  
Harry P. Macdonald  
BY  
ATTORNEYS.

Jan. 12, 1926.  1,569,839
H. P. MACDONALD
FLEXIBLE JOINT
Filed June 26, 1920   2 Sheets-Sheet 2
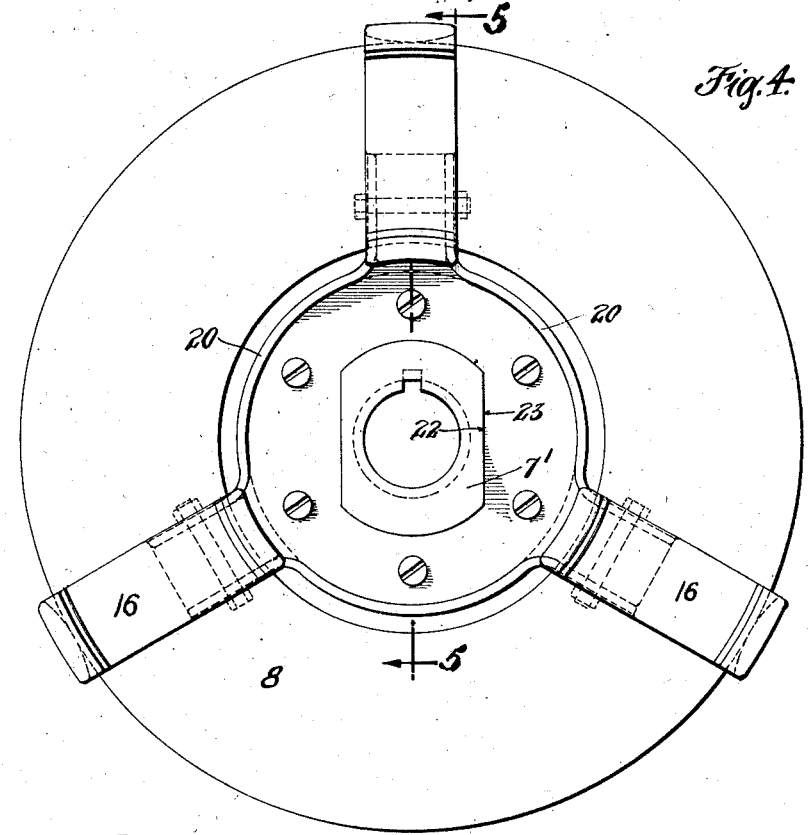
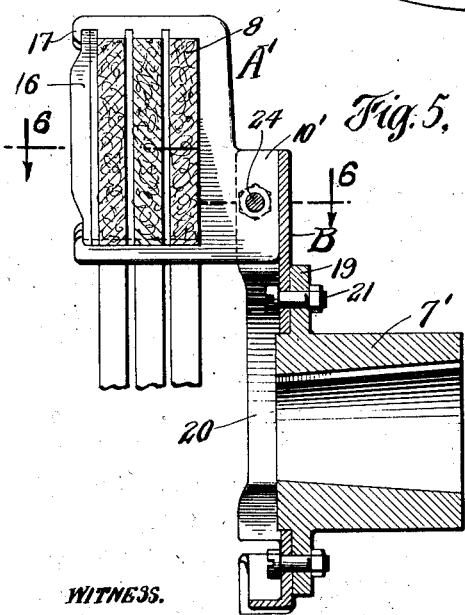
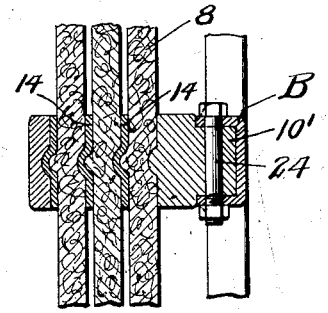
WITNESS.
Gustav Genglinger.
INVENTOR.
Harry P. Macdonald
BY
Synnestvedt & Lechner
ATTORNEYS.

Patented Jan. 12, 1926.

1,569,839

UNITED STATES PATENT OFFICE.

HARRY P. MACDONALD, OF MONTCLAIR, NEW JERSEY, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

FLEXIBLE JOINT.

Application filed June 26, 1920. Serial No. 391,888.

*To all whom it may concern:*

Be it known that I, HARRY P. MACDONALD, a citizen of the United States, residing at Montclair, in the county of Essex and State of New Jersey, have invented certain new and useful Improvements in Flexible Joints, of which the following is a specification.

This invention relates to flexible joints for torque transmission assemblies, such as used, for example, in automobiles, and it has particular reference to joints in which the flexible elements are made of leather, rubberized fabric and the like, usually in the form of discs.

The general practice with respect to joints of this character is to provide spiders for the adjacent ends of the shafts to be joined and to interpose therebetween one or more flexible discs of yielding material such as above indicated, which are secured to the feet of the respective spiders by means of bolts which are passed through holes formed in the spider feet and in the discs. The presence of holes in the discs tends toward weakness and under service conditions it is almost invariable that the discs fail at the bolt holes.

It is the primary object of my invention to overcome this difficulty in a joint in which the flexible elements will be securely gripped and the life of the joint, considered as a whole, greatly extended.

More specifically considered, it is an object of my invention to provide a simple and effective means for exteriorly clamping the flexible elements to their respective spiders to avoid the weakening of the material by the cutting of holes therein.

Figure 1:
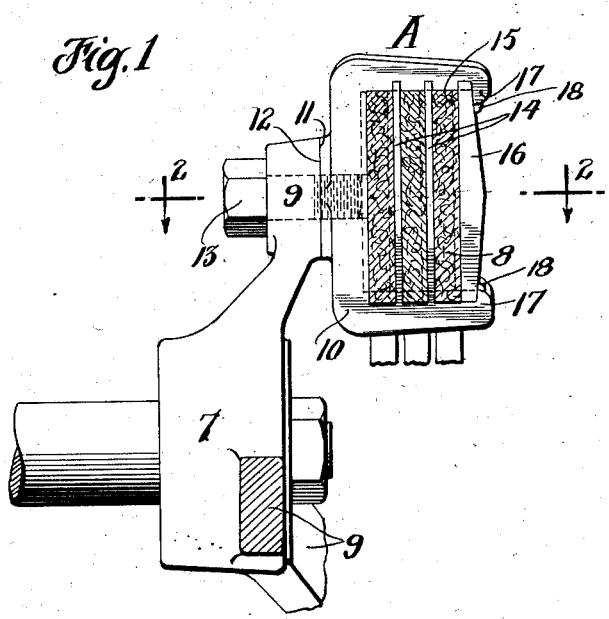
Figure 2:
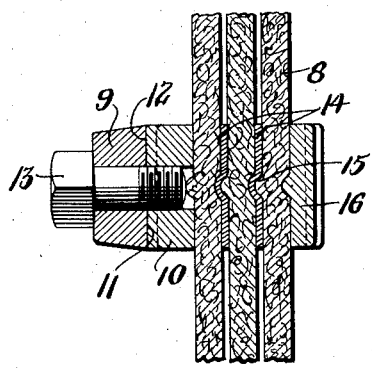
Figure 3:
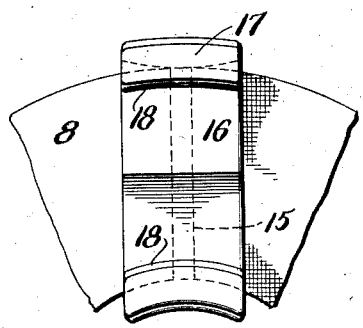

The foregoing, together with such other objects as may hereinafter appear, I obtain by means of a construction, the preferred embodiments of which I have illustrated in the accompanying drawing, wherein:

Fig. 1 is a fragmentary side elevation of a spider and its shaft forming part of a joint embodying my improvements; Fig. 2 is a section taken on the line 2—2 of Fig. 1; Fig. 3 is an end elevation of the clamping means shown in Fig. 1; Fig. 4 is an elevation of a joint embodying a modification of my invention; Fig. 5 is a section on the line 5—5 of Fig. 4; and Fig. 6 is a section on the line 6—6 of Fig. 5.

Referring now to the drawings, but one of the two spiders 7 of the joint is shown. Such spiders may be of any preferred type and are secured to the ends of the respective shafts in any desired manner. The flexible elements are indicated at 8, and in this embodiment of my invention, they take the form of annular discs, preferably composed of rubberized fabric as a yielding material. A shown, the spiders have three feet 9, it being understood that the spiders are offset so that their feet extend at 60° with respect to each other as is well understood in this art. The flexible elements are secured to the respective spider feet by means of a clamping device indicated as a whole by the reference letter A.

Each clamping device consists of a forked or yoke member 10 which has a relatively broad seat 11 adapted to take against a similar seat 12 on the spider feet, the clamp and spider foot being apertured for the reception of a stud or similar holding member 13, by means of which the clamp may be detachably secured to the spider. The extended bearing surfaces serve to relieve the stud of certain of the strains.

The flexible discs fit between the arms of the yoke and washers or plates 14 are interposed between the discs, such washers being roughened, as for example, by corrugating or beading the same, as indicated at 15, and a similarly shaped follower plate 16 is used as the outside holding member, such plate, however, being of much stouter construction than the intermediate washers. The arms of the yoke are given an irregular shape in cross section, such as indicated in Fig. 3, and the ends of the washers 14 and 16 are slightly forked to partially fit the yoke arms and thereby hold the washers from shifting laterally out of place.

In assembling the clamps and discs, the yokes are positioned and pressure is applied to the follower plates 16 in an amount sufficient to secure the desired pressure and grip on the discs, after which the end portions 17 of the yoke arms are bent over as indicated in Fig. 1, whereby the parts are held in the desired position and under the predetermined pressure. If desired, the turned over ends 17 and the follower plate 16 may be welded together, as indicated at 18.

It will be seen that by this arrangement the full strength of the flexible element is retained and at the same time an effective joint is secured as it will be clear that the roughened or beaded surfaces engaging the discs will prevent circumferential creeping. The connecting and clamping means A externally embraces the disc, and its clamping portions that engage the opposite faces of the disc are externally secured and held against it by means of the yoke arms. The connection is rendered very effective for transmission of torque by the lateral engagement between clamping means and discs, especially when the clamping means are roughened, or when gripping pressure is preimposed on the yielding discs, as described above. It will also be seen that any desired degree of flexibility may be obtained by increasing or decreasing the width of the washer members and yoke arms. The arrangement is also applicable to discs of any width within practical limits, the strength of the follower plates 16 being increased or diminished as required. In this case, the transverse or radial confinement of the disc material by the engagement of the connecting means shown in Figs. 1–5 with the edges of the discs is also particularly advantageous, since it tends to prevent spreading apart of the cords under the lateral pressure on the discs.

Referring now to the construction shown in Figs. 4, 5 and 6, it will be seen that, in this instance, the complete spider structure comprises a hub portion 7′ provided with a shoulder or flange 19 just short of its outer end, and a separate spider member formed out of a plate B, preferably in the form of a stamping, having three feet and provided at its edges with reinforcing ribs or flanges 20. The end of the hub portion 7′ is flatted on two sides as indicated at 22, and the plate B is provided with an aperture, correspondingly flatted as at 23, to fit over the end of the hub. This construction is designed to relieve the bolts 21 which serve to detachably secure the plate to the hub from at least a portion of the torque strains. It will be seen that the feet, by reason of the flanges 20, are of channel-like form adapted to receive the base portion 10′ of the clamps A′, which otherwise are of the construction hereinbefore described. Bolts 24 passing through the flanges 20 serve to detachably secure the clamping yokes to the spider feet. This construction insures a rigid connection for the reason that the flanges 20 may be drawn into tight engagement with the clamp when the nuts of the bolts 24 are tightly drawn up.

This arrangement is simple, economical, and easy to assemble or take apart. The bolts 24 are also relieved of a greater portion of the strains,—as are the studs 13 of the first construction.

The general construction is such as to make the device peculiarly applicable to cord discs which are of so great a strength that the rubber does not hold the cords together sufficiently to develop the full strength of the latter. The clamps by their engagement over the full width of the discs engage all of the cords so that the full strength is availed of.

It will, of course, be understood that I do not limit myself to the precise construction shown and described, and that the desired results may be accomplished by other and equivalent means coming within the spirit of my invention as defined herein and set forth in the claims. The term spider, as found in the claims, is also to be understood as being used in a broad sense.

I claim:

1. In a torque transmitting joint, the combination of a spider, a flexible unit comprising a flexible member and clamp means attached thereto independently of the spider, and means for connecting the clamp means to the spider for the transmission of torque extending approximately parallel the line of torque.

2. In a torque transmitting joint, the combination of a spider having a projection extending laterally beyond a face thereof, a flexible member, a connecting member attached thereto independently of the spider, and means passing through said projection and said connecting member to secure the latter to the spider.

In testimony whereof, I have hereunto signed my name.

HARRY P. MACDONALD.